(12) United States Patent
Lewis

(10) Patent No.: US 8,352,103 B2
(45) Date of Patent: Jan. 8, 2013

(54) METHOD AND APPARATUS FOR PROVIDING A RUNWAY LANDING SYSTEM

(76) Inventor: Oscar Lewis, Cary, NC (US)

( * ) Notice: Subject to any disclaimer, the term of this patent is extended or adjusted under 35 U.S.C. 154(b) by 338 days.

(21) Appl. No.: 12/911,223

(22) Filed: Oct. 25, 2010

(65) Prior Publication Data

US 2011/0098872 A1    Apr. 28, 2011

Related U.S. Application Data

(60) Provisional application No. 61/254,905, filed on Oct. 26, 2009.

(51) Int. Cl.
*B64F 1/18* (2006.01)
*B64F 1/36* (2006.01)
*G08G 5/06* (2006.01)

(52) U.S. Cl. .............. 701/16; 701/120; 244/114 R

(58) Field of Classification Search ............... None
See application file for complete search history.

(56) References Cited

U.S. PATENT DOCUMENTS

| 3,572,619 | A | * | 3/1971 | Brown ................ 244/114 R |
| 4,093,937 | A | * | 6/1978 | Habinger ................ 340/949 |
| 7,014,146 | B2 | * | 3/2006 | Villaume et al. ........... 244/111 |
| 2008/0249625 | A1 | * | 10/2008 | Waugh et al. ............. 623/17.16 |
| 2009/0150068 | A1 | * | 6/2009 | Villaume et al. ............ 701/206 |
| 2009/0323320 | A1 | * | 12/2009 | Goodman et al. ......... 362/153.1 |

FOREIGN PATENT DOCUMENTS

JP    2008-59162    * 3/2008

* cited by examiner

*Primary Examiner* — Michael J. Zanelli
(74) *Attorney, Agent, or Firm* — Murphy, Bilak & Homiller, PLLC

(57) ABSTRACT

One non-limiting but advantageous aspect of the present invention relates to improved airport efficiency and capacity through higher utilization of a primary runway. The improvements derive from the use of one or more high-speed exit ramps that interconnect the primary runway to a high-speed landing way running parallel to the primary runway. The high-speed exit ramp(s) enable a landing aircraft to negotiate a high-speed transition from the primary runway to the high-speed landing way, so that the aircraft completes its landing roll out and transition to taxiing speeds on the high-speed landing way rather than the primary runway. In at least one embodiment, a computerized landing controller indicates to pilots of landing aircraft whether their aircraft are permitted to take a high-speed exit ramp via control of an associated high-speed exit lighting system.

22 Claims, 8 Drawing Sheets

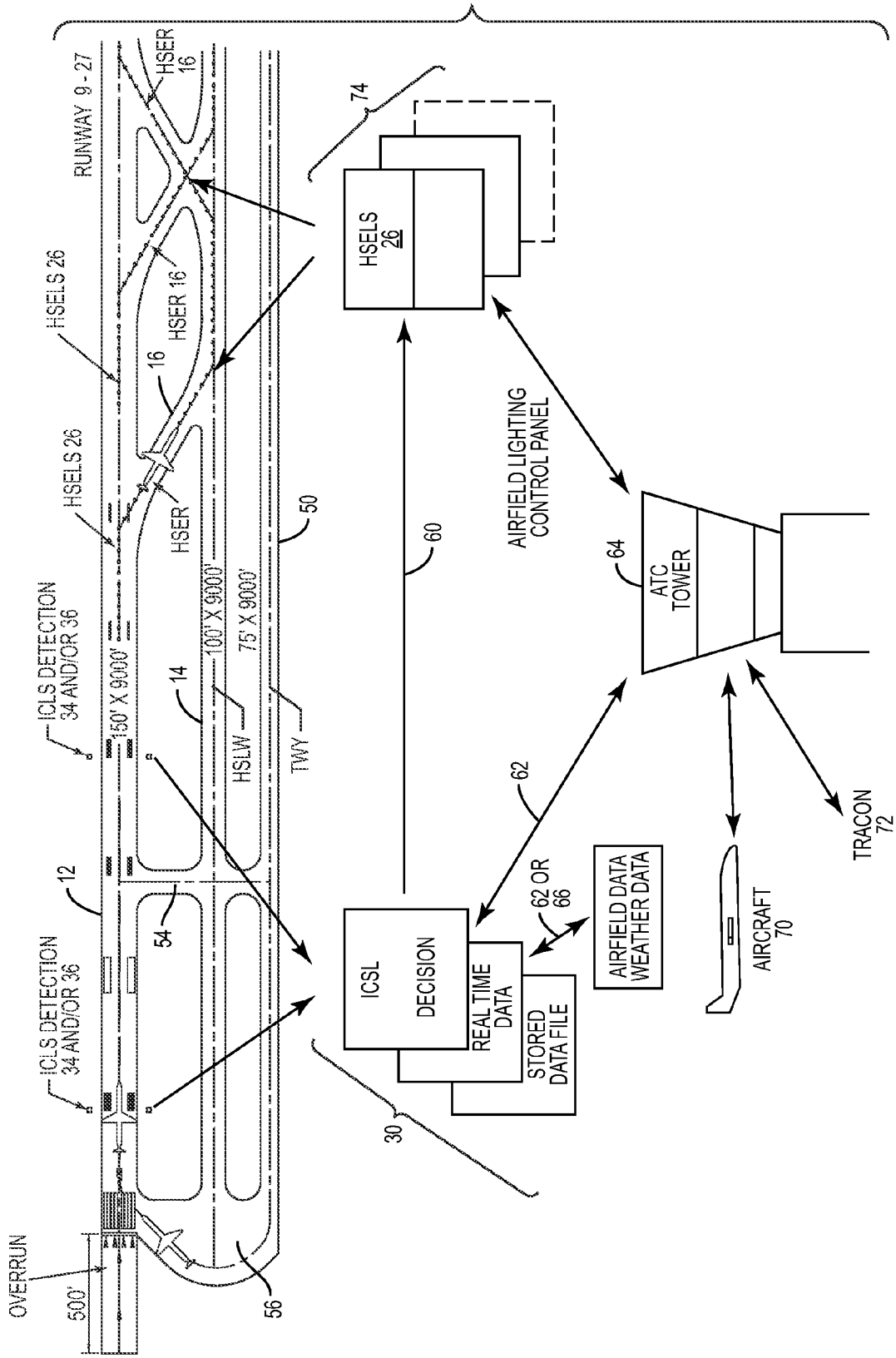

METHOD AND APPARATUS FOR PROVIDING A RUNWAY LANDING SYSTEM

RELATED APPLICATIONS

This application claims priority under 35 U.S.C. §119 to U.S. provisional patent application Ser. No. 61/254,905, filed Oct. 26, 2009, the entire contents of which application are incorporated by reference herein.

BACKGROUND

The runway is the starting and ending point for aircraft flight operations. Runways represent the foundational technology component underlying the entire national airspace and air traffic systems. Many runways were designed and built in the early and mid 1900s. With few innovative conceptual changes along the way, the rules and procedures for landing and takeoff remain largely the same today.

As airport traffic count increases, airport authorities work to manage growth by building new passenger terminals and additional runways. Expansion plans are limited due to the lack of land, building funds or community approval. This is common at major airports throughout the world where roads, railroads, communities and industries have sprouted up around airfields' perimeter fences. Some airports, such as Logan and Regan-National, are constrained by surrounding water.

To solve the delay problem, airport authorities and users are asking for more runways and state-of-the-art space based air traffic systems. These modernizations and upgrades are costly and can take many years to complete. On occasion, airport upgrades are outdated before completion. There is little to no funding for improving existing runway capacity to handle more arrivals and departures. It is assumed by many that an existing runway cannot increase traffic count without jeopardizing safety. Therefore, the conventional solution is to build a new runway, to increase capacity. That solution is viewed essentially as the only choice for increasing capacity, because runway capacity increases cannot be achieved using today's runways and rules which allow one aircraft—one runway (landing or takeoff) at a time.

SUMMARY OF THE INVENTION

One non-limiting but advantageous aspect of the present invention relates to improved airport efficiency and capacity through higher utilization of a primary runway. The improvements derive from the use of one or more high-speed exit ramps that interconnect the primary runway to a high-speed landing way running parallel to the primary runway. The high-speed exit ramp(s) enable a landing aircraft to negotiate a high-speed transition from the primary runway to the high-speed landing way, so that the aircraft completes its landing roll out and transitions to taxiing speeds on the high-speed landing way rather than the primary runway.

Accordingly, in one or more embodiments, an airport runway system as provided herein comprises a primary runway for aircraft landing and a high-speed landing way running in parallel with the primary runway, and at least one high-speed exit ramp positioned at a defined point along the length of the primary runway. The high-speed exit ramp comprises an angled departure path from the primary runway onto the high-speed landing way and is configured to allow a high-speed transition of an aircraft during its landing roll from the primary runway to the high-speed landing way.

Further, in one or more embodiments, the teachings herein provide an airport runway system comprising a landing controller that is configured to compute a landing solution for an aircraft landing on a primary runway and to determine from the landing solution whether to permit said aircraft to take a high-speed exit ramp that interconnects the primary runway with a high-speed landing way running parallel to the primary runway. The system further includes a high-speed exit lighting system that is responsive to said landing controller to provide a pilot of said landing aircraft with a visual indication of whether said landing aircraft is permitted to take said high-speed exit ramp onto said high-speed landing way.

Still further, in one or embodiments, the teachings herein provide a method of aircraft landing control implemented by a computerized landing controller. The method includes dynamically determining a landing solution for an aircraft landing on a primary runway, based on detecting or otherwise receiving aircraft information for said aircraft, and determining from the landing solution whether to permit said aircraft to take a high-speed exit ramp interconnecting the primary runway with an adjacent high-speed landing way running parallel to said primary runway. Further, the method includes controlling a high-speed exit lighting system that is responsive to said landing controller to provide a pilot of said landing aircraft with a visual indication of whether said landing aircraft is permitted to take said high-speed exit ramp onto said high-speed landing way.

Broadly, the above embodiments or selected elements from them are referred to as the "Landing Exit Way Integrated System" or LEWIS, which may be understood as a New Generation Smart Runway System (NGSRS) that substantially increases runway efficiency, and thereby provides for greater numbers of takeoffs and departures. As detailed in the above example embodiments, in one or more embodiments, the LEWIS-NGSRS includes a high-speed landing way (HSLW) running parallel to a primary runway and interconnected with the primary runway by at least one high-speed exit ramp (HSER).

The HSER is configured to allow a landing aircraft to safely exit the primary runway at relatively high speeds, e.g., ±80 knots, and transition onto the HSLW. For example, in one embodiment, the HSER provides a first, traction-enhanced 30-degree turn from the primary runway onto the HSER, and a second, traction-enhanced 30-degree turn onto the HSLW. These optimized turns allow a landing aircraft to transition off of the primary runway while still in its landing roll out, and onto the HSLW where its gradually slows down to its taxi roll. Doing so clears the primary runway much earlier than would be the case if the landing aircraft used the primary runway for slowing to a taxi roll.

Notably, as part of the LEWIS-NGSRS, an "Integrated Computer Landing System" (referred to as an ICLS or a landing controller) computes landing aircraft solutions (also referred to as "landing profiles"). As an example, the landing solution computations consider any one or more of detected landing weight, speed, and touchdown position, current weather/runway conditions, along with one or more aircraft type/category characteristics known for the landing aircraft. The landing solution determines, among other things, whether the landing aircraft can safely utilize any of the one or more HSERs that are positioned downfield, along the main runway.

Complementing that determination, the LEWIS-NGSRS includes, in one or more embodiments, a High Speed Exit Lighting System (HSELS) that controls HSER usage by the landing aircraft. For example, assuming the primary runway is configured with one HSER interconnection to the parallel HSLW, the landing controller computes a landing solution for a landing aircraft, and that solution establishes whether the landing aircraft can safely utilize the HSER. If so, the HSELS provides the appropriate lighting indicators, directing the pilot of the landing aircraft onto the HSER.

In installations having more than one HSER—for example, two HSERs at spaced apart locations along the length of the primary runway—the landing solution determines which HSER, if any, is to be used by the landing aircraft. The system may be configured to select to the earliest HSER along the primary runway's length that can be safely used by the landing aircraft, or may be configured to balance aircraft exiting speeds against time on the primary runway.

Of course, the present invention is not limited to the above features and advantages. Those of ordinary skill in the art will recognize additional features and advantages from the following detailed description of example embodiments and from the accompanying example illustrations.

DETAILED DESCRIPTION OF ONE OR MORE EMBODIMENTS

Figure 1:
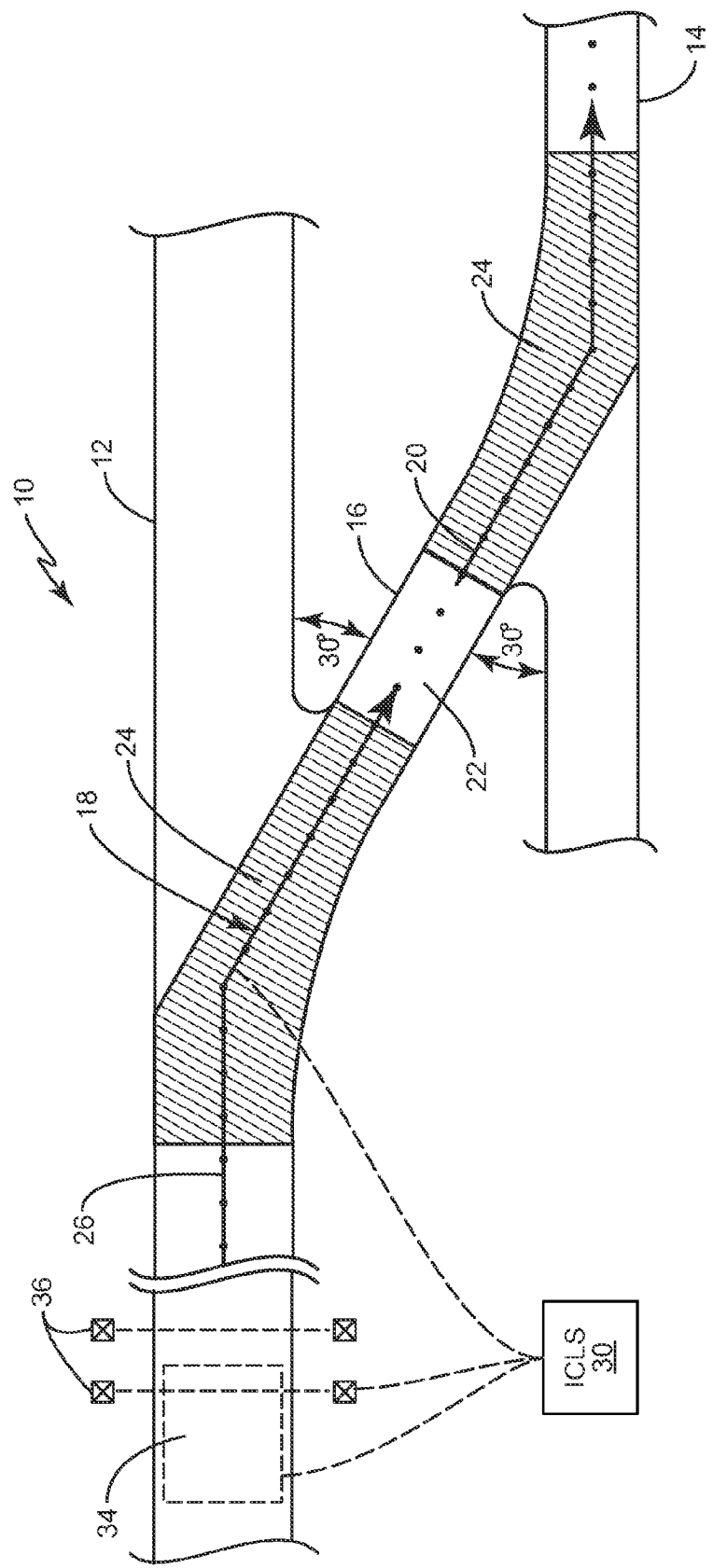
FIG. 1 illustrates one embodiment of an airport runway system.

FIG. 1 illustrates a non-limiting example embodiment of an aircraft landing system, referred to herein as an airport runway system 10, or simply "system 10." In one embodiment, the system 10 comprises a primary runway 12 for use by landing aircraft, a high speed landing way (HSLW) 14 running parallel to the primary runway 12, and a high speed exit ramp (HSER) 16 diagonally interconnecting the primary runway 12 to the high speed landing way 14. The high speed exit ramp 16 is configured to provide a high speed exit from the primary runway 12 and onto the high speed landing way 14, for landing aircraft.

In one or more embodiments, the high speed exit ramp 16 includes a first turn 18 of approximately thirty degrees off of the primary runway 12, a second turn 20 of approximately thirty degrees onto the high speed landing way 16, and an intermediate length 22 running between the first and second turns.

Figure 7A:
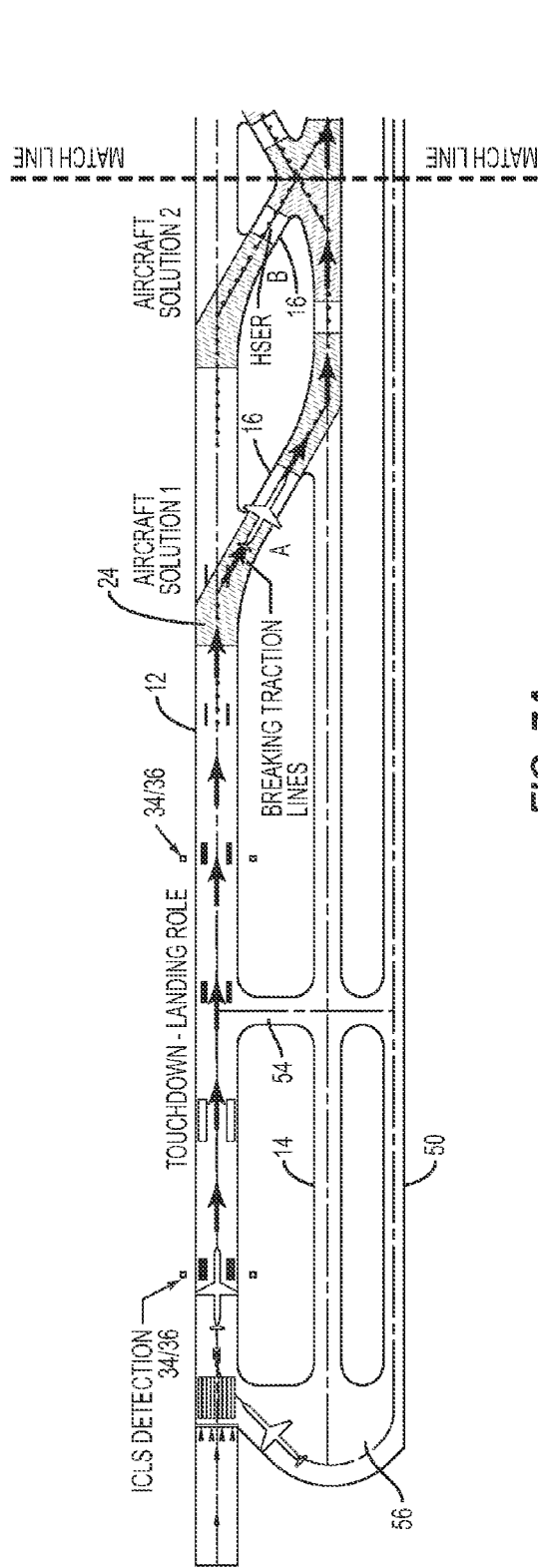
Figure 7B:
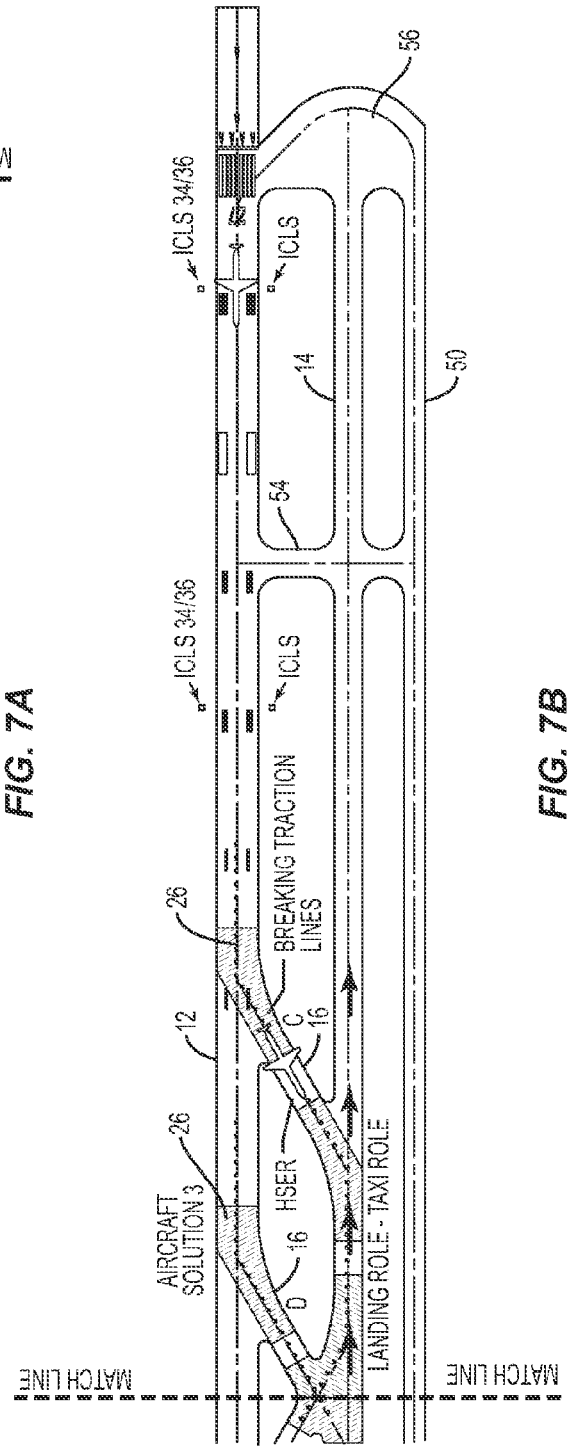
Figure 8A:
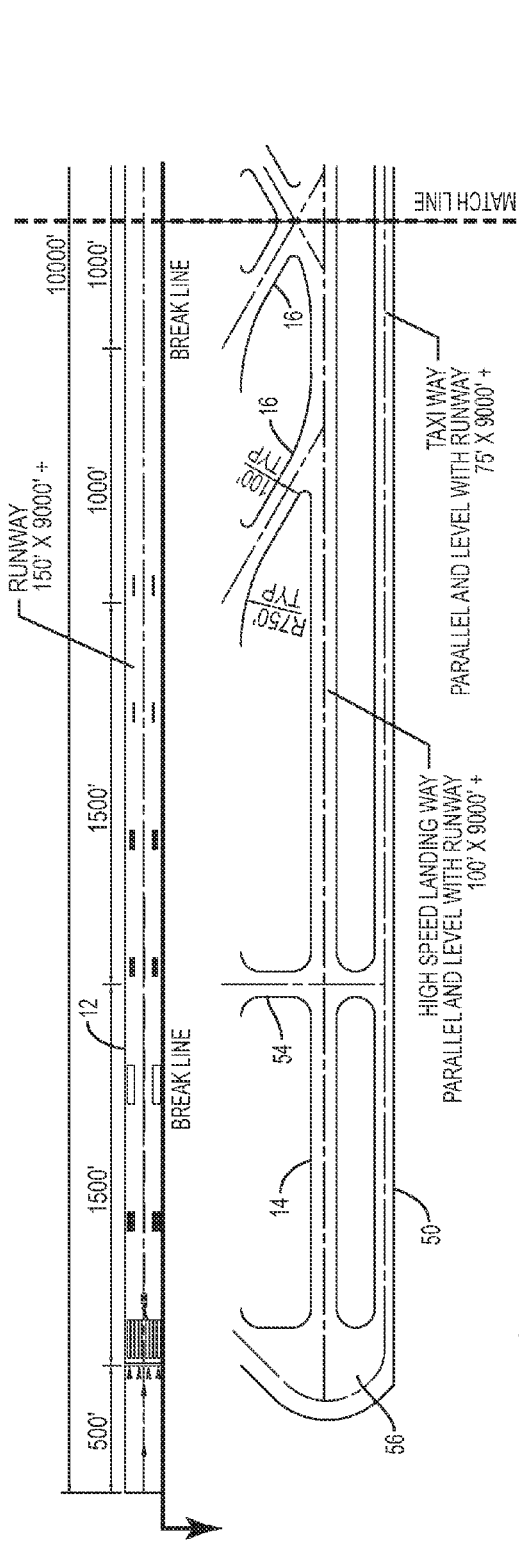
Figure 8B:
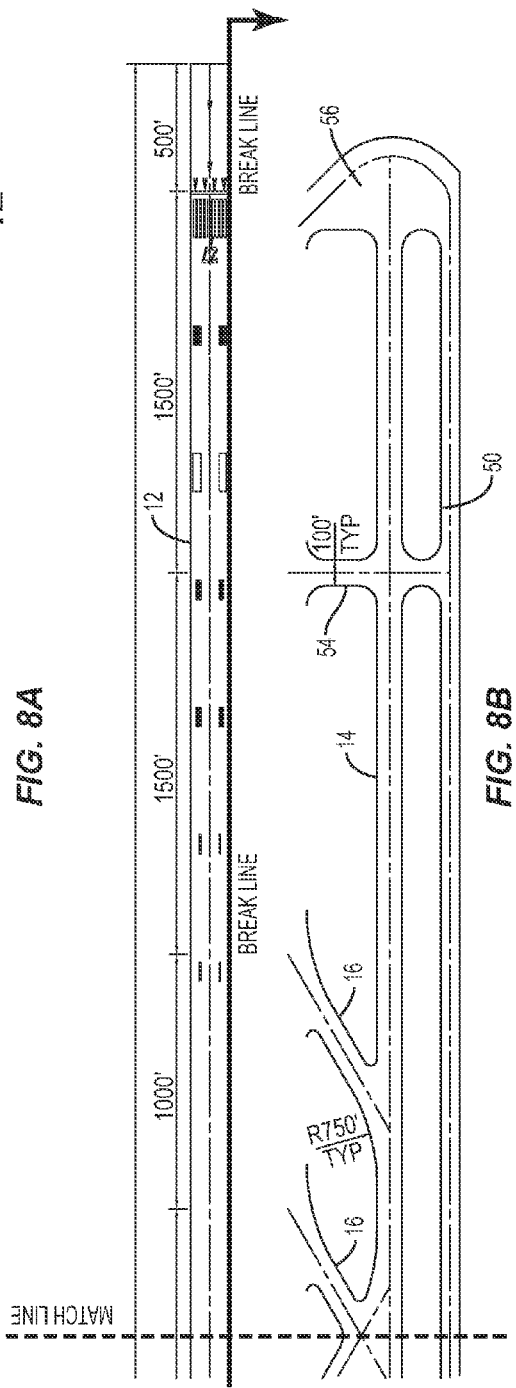

Optionally, to assist with high speed maneuvering by landing aircraft onto and off of the high speed exit ramp 16, one or both of the first and second turns include traction surfaces 24. (As is later detailed in FIGS. 7A and 7B, these traction surfaces 24 may be lines or breaks formed or cut in the surface, for example. However formed, it will be understood that the traction surfaces 24 offer enhanced traction for an aircraft executing high-speed turns onto or off of the high-speed exit ramp 16. "Enhanced" traction may be understood as being a higher level of traction than is provided by the nominal runway surface.) However, with or without these traction surfaces 24, the high speed exit ramp is configured to permit a landing aircraft to exit the primary runway 12 at or near landing roll speeds, rather than having to remain on the primary runway 12 for its landing roll out. That is, the aircraft transitions from the primary runway 12 to the high-speed landing way 14 during its landing roll, rather than the customary transition from a primary runway to a taxiway after completing the landing roll and transitioning into the lower-speed taxi roll.

By way of non-limiting example, the primary runway 12 has a length at or greater than 7,000 feet. Correspondingly, in one embodiment, a first high speed exit ramp 16 is positioned at a distance of approximately 4,000 feet down the primary runway 12. (This measurement is taken from the landing end of the primary runway 12.) While not explicitly shown in FIG. 1, the primary runway 12 may have more than one high speed exit ramp 16. For example, it may have a second high speed exit ramp 16 positioned at a distance of approximately 5,000 feet down the primary runway 12. The addition of a second or even third high speed exit ramp 16 increases flexibility of the system 10. For example, an aircraft carrying too much weight or speed for safe use of the first high speed exit ramp 16 may safely use a later high speed exit ramp 16.

As such, it will be understood that the strategic location of high speed exit ramps 16 is contemplated herein. For example, when using a single high speed exit ramp 16, its placement along the primary runway's length should balance the likelihood that all or most types of landing aircraft will be able to safely utilize it (at least under good landing conditions) versus the desire to move landing aircraft off the primary runway 12 as early as possible.

Also as shown in FIG. 1 the high speed exit ramp 16 preferably is associated with a high-speed exit lighting system (HSELS) 26 that is controlled to indicate to a landing aircraft whether it is or is not permitted to use the high speed exit ramp 16. Correspondingly, the overall system 10 in one or more embodiments further includes an aircraft landing apparatus comprising an integrated computer landing system (ICLS) 30 that functions as an aircraft landing system by providing for management/safe-usage of the high speed exit ramp(s) 16. The ICLS 30 will be referred to as the "landing controller 30" and as will be detailed later herein the landing controller 30 may have a number of interfaces, such as control/communication connections for controlling the high-speed exit lighting system 26.

Determination of whether a particular one (or any) of the available high speed exit ramps 16 can be safely used by a given aircraft may be made to depend on a calculated "landing solution" (also referred to as a "landing profile") that factors in, for example, the type of landing aircraft, and its detected or reported landing weight and speed. (The landing solution also may incorporate a wide variety of other dynamic parameters, such as prevailing runway conditions, whether IFR or VFR rules are active, etc.) The aircraft landing system 10 of FIG. 1 thus may incorporate a landing weight detection system 34 and/or a landing speed detection system 36, for detecting actual landing speeds and weights of aircraft landing on the primary runway 12. The landing weight detection system 34 may be a weight and/or force detection system integrated along the actual touchdown area of the primary runway 12, and the landing speed detection system 36 may comprise optical based speed detection, radar based speed detection, or other speed detection circuitry.

Figure 2:
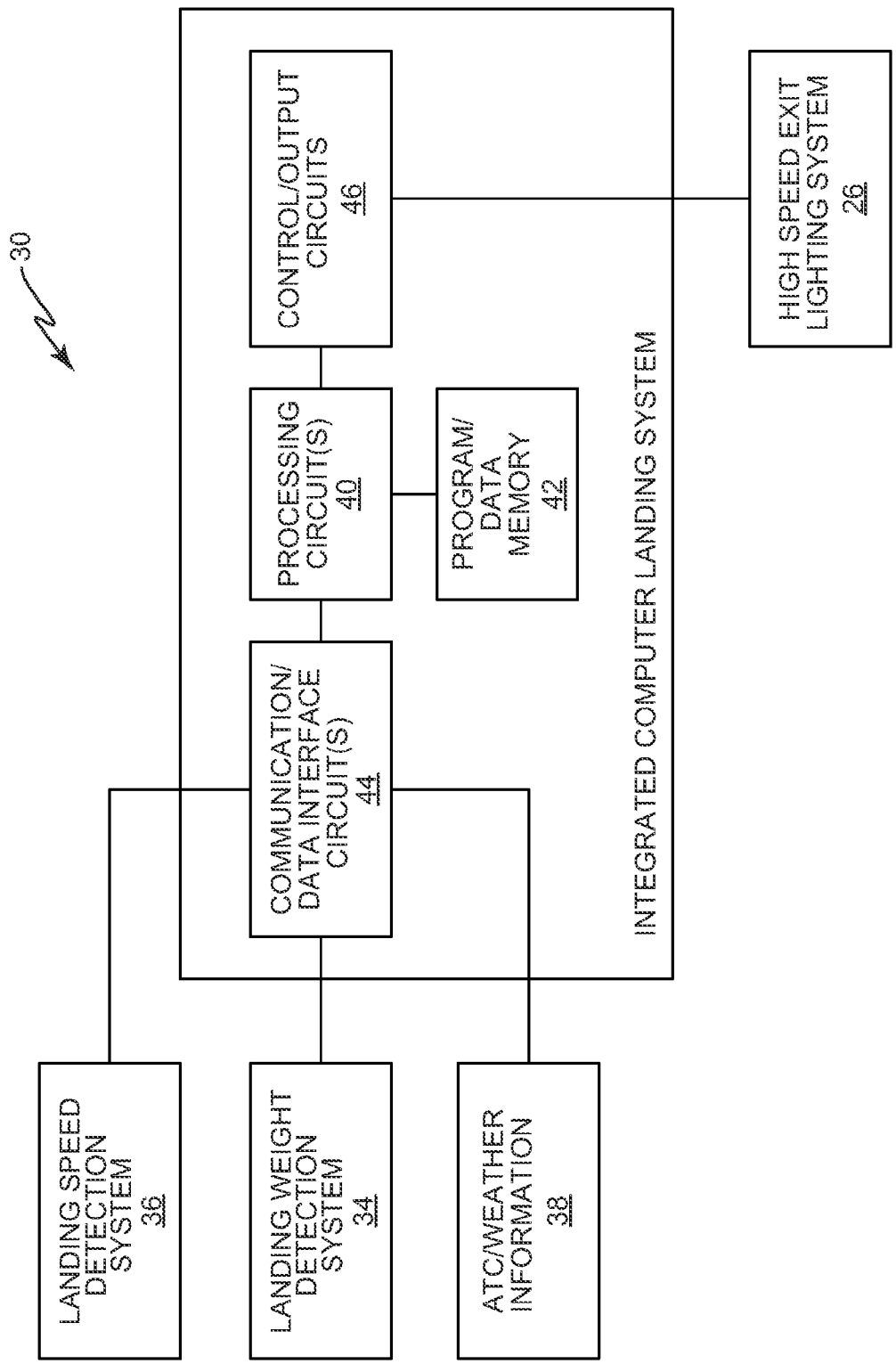
FIG. 2 illustrates one embodiment of a landing controller, which is included in one or more embodiments of the airport runway system of FIG. 1.

With the above in mind, one sees in FIG. 2 an example embodiment of the landing controller introduced in FIG. 1. In particular, the illustrated landing controller 30 comprises one or more processing circuits 40 that are configured to compute a landing solution for a landing aircraft landing on the primary runway 12, and to allow or disallow the landing aircraft to perform a high speed exit onto the high speed landing way 14, via the high speed exit ramp 16, based on the landing solution.

Those skilled in the art will appreciate that the processing circuits 40 are, in one embodiment, computer-based processing circuits having access to one or more memory systems (and/or storage devices or other computer-readable media) 42. The memory 42 embodies one or more computer programs, the execution of which configures and specially adapts the processing circuits 40 according to the functionality described herein.

Further, from the illustration, one sees that the landing controller 30 includes communication/data interface circuits 44. These circuits include, for example, wired or wireless networking interfaces and/or dedicated signal interconnections. Such interfaces may be used to interconnect the landing controller 30 to the landing weight detection system 34 and the landing speed detection system 36 (although their data also may be obtained indirectly via another communications interface.) The landing controller 30 also may interface with an air traffic control/weather information system 38 that provides, e.g., indications of runway conditions. For example, the ATC/weather information may indicate whether the landing controller 30 should allow or not allow any use of the high-speed landing way 14 and/or may provide aircraft-specific information.

In that regard, it will be understood that the landing solution determined by the landing controller 30 may comprise a go/no-go decision on whether a given aircraft is permitted to take a given high-speed exit ramp 16, where the go/no-go decision is determined by the landing controller 30 as a function of one or more items of aircraft information, such as: (1) aircraft type or classification; (2) aircraft weight; (3) aircraft speed; and (4) one or more additional variables, such as a day/night indicator, a runway conditions/weather indicator, a VFR/IFR indicator, etc. Aircraft weight and speeds may be based on detected values or based on nominal aircraft data, such as typical weights and speeds for given types, classifications, or models of aircraft, and it should also be understood that such information may be provided by the aircraft itself or through associated air traffic control information.

In this regard, the interfaces 44 may provide one or more communication links for receiving aircraft information used by the processing circuits 40 to compute a landing profile for a given aircraft landing on the primary runway 12. The aircraft information may include one or more items of information, such as Air Traffic Control (ATC) information for landing aircraft, including reported aircraft type, weight, speed, etc. The interfaces 44 in one or more embodiments also provide for receiving weather information, including updated temperature, wind, etc. The illustrated embodiment also includes one or more control interfaces 46, such as a control interface circuit for controlling the high-speed exit lighting system 26.

In any case, in one or more embodiments, the landing controller 30 is configured to compute the landing solution for a given landing aircraft based on one or more of the following dynamic parameters: a landing speed of the landing aircraft, a landing weight of the landing aircraft, a landing aircraft type or category, one or more current runway condition parameters, and a VFR/IFR status parameter. As noted for one or more embodiments, the aircraft landing apparatus (landing controller 30) of FIG. 2 includes or is associated with a landing speed detection system 36 to detect a landing speed of the landing aircraft and a landing weight detection system 34 to detect a landing weight of the landing aircraft. Correspondingly, the landing controller 30 is configured to calculate the landing solution for the landing aircraft based at least in part on the detected landing speed and weight.

For example, the landing controller 30 uses the detected weight and speed to determine whether to permit the aircraft to take a given high-speed exit ramp 16. In particular, the landing controller 30 may be configured with knowledge of the locations of every high-speed exit ramp 16 along the primary runway 12 and it may use these locations (i.e., distance positions along the runway's length) to predict the rolling speed of the aircraft in relation to each high-speed exit ramp 16. In this manner, the landing controller 30 can decide whether the aircraft is or is not permitted to take a given high-speed exit ramp 16 based at least in part on the rolling speed predicted for the aircraft at the runway location corresponding to that high-speed exit ramp 16. As an example of a more complete landing solution determination, the landing controller 30 may use the aircraft weight and type information in conjunction with the predicted rolling speeds (and/or braking information for the aircraft, such as provided by telemetry systems onboard the aircraft) to make a go/no-go decision for the aircraft with respect to each high-speed exit ramp 16.

Thus, one or more embodiments of the landing controller 30 computes, as part of the landing solution, a predicted rolling speed of the landing aircraft at positions along the length of the runway corresponding to the one or more high speed exit ramps 16. The landing controller 30 determines whether to permit the landing aircraft to use one of one or more high speed exit ramps 16 based at least in part on the predicted rolling speed. A more complete landing solution computation determines whether to permit the landing aircraft to use one of the one or more high speed exit ramps 16 based on a detected or reported landing speed and weight of the landing aircraft, a known type of the landing aircraft, and one or more prevailing runway condition parameters. In any case, the landing solution calculations are completed well in advance of the landing aircraft reaching the high-speed exit ramp location(s).

Also, note that the landing controller 30 may operate in modes where it does not compute landing solutions (or otherwise ignores them or computes a default "no-go" landing solution for every landing aircraft), and instead disallows all high-speed exit ramp use. This setting may be manually imposed by operator control and/or it may be automatically invoked responsive to entering nighttime flight operations, or anytime IFR are active. Of course, these override control aspects are configurable, and the landing controller 30 can be configured within applicable aviation safety rules according to the unique needs and capabilities of the associated runway system 10 by setting such configuration settings.

Further, as briefly noted in the discussion of FIG. 1, the high speed exit ramp(s) 16 are associated with high speed exit lighting systems 26 and FIGS. 1 and 2 correspondingly depict example high-speed exit lighting systems 26 that operate under direct (or indirect) control of the landing controller 30. The landing controller 30 may have dedicated or general purpose control and communication interface circuits for outputting high-speed exit ramp usage control data. That is, for a given landing aircraft, the landing controller 30 receives or otherwise obtains dynamic landing parameters for the landing aircraft (e.g., speed, weight, etc.), computes a corresponding landing solution which determines whether the landing aircraft can or cannot safely use an available high-speed exit ramp 16, and then outputs high-speed exit lighting system control information, for proper control of the high-speed exit lighting system 26.

In this manner, pilots of landing aircraft are provided with unambiguous lighting controls that indicate which high-speed exit ramp 16 (if any) they are supposed to use. Note that the high-speed exit lighting system 26 generally includes sets of indicator control lights/beacons for each high-speed exit ramp 16 installed along the primary runway 12, and that high-speed exit lighting control cooperatively sets the illumination state/color of all such lights, to avoid any ambiguous indications.

Broadly, then, in at least one embodiment, the high-speed exit lighting system 26 is configured to indicate whether the landing aircraft is or is not permitted to use any particular one or ones of the high speed exit ramps 16 that are available on a given primary runway 12. Correspondingly, the landing controller 30 or another operatively associated controller controls the high-speed exit lighting system 26 according to the landing profile computed by the landing controller 30 for an aircraft landing on the primary runway 12. And, as noted, the high-speed exit lighting system 26 comprises, for each high speed exit ramp 16, one or more visible indicators operative to indicate whether the landing aircraft is permitted to use the high speed exit ramp 16.

Referring to the above airport runway system 10 as the Landing Exit Way Integrated System (LEWIS) New Generation Smart Runway System (NGSRS), those skilled in the art will immediately appreciate the potentially significant increases in runway capacity provided by the LEWIS-NGSRS. Critically, the LEWIS-NGSRS increases runway capacity while maintaining the one aircraft-one runway rule. This gain in capacity is accomplished by allowing a landing aircraft the option of exiting the primary runway 12 onto a high-speed landing way 14 via the high-speed exit ramp 16. The LEWIS-NGSRS is designed to compliment current and future air traffic system modernization programs by increasing the flow of aircraft in and out of the airport traffic area (ATA). It is a valuable aid to air traffic controllers in increasing capacity while reducing verbal communications between aircraft.

In one or more embodiments, the LEWIS-NGSRS utilizes a number of new generation high tech runway components or subsystems, including: a New Generation Smart Runway System (NGSRS) including a primary runway 12 interconnected via one or more high-speed exit ramps 16 to a high-speed landing way 14; an Integrated Computer Landing System (landing controller 30); and a High Speed Exit Lighting System (HSELS) 26. At least one embodiment contemplated herein includes all of these subsystems for rapidly transitioning a landing aircraft off the (primary) landing runway 12 and onto a new parallel high-speed landing way 14 via a high-speed exit ramp 16 that interconnects the primary runway 12 to the high-speed landing way 14.

Further, in one or more embodiments that use more than one high-speed exit ramp 16, the LEWIS collects and evaluates electronic aircraft flight data, environmental and airfield conditions. Data collected is used to calculate landing distances and determine the appropriate high-speed exit ramp 16 for a given landing aircraft. As a landing aircraft crosses the runway threshold, the landing controller 30, which is a new generation computer-sensor system, rapidly calculates a landing aircraft solution that is used by the landing controller 30 to determine whether the aircraft will be permitted to take a high-speed exit ramp 16 onto the high-speed landing way 14.

As noted, in one or more embodiments, the landing solution is computed as a function of one or more items of information, referred to "aircraft information." The data items may be detected or measured by the landing controller 30, or known by the landing controller 30 based on configuration information, or provided to the landing controller 30 (e.g., via the interface circuits 44). In at least one embodiment, the landing profile is based on one or more of aircraft touchdown weight, aircraft characteristics or type/classification, landing speed, weather, field conditions, traffic and potentially other related data and variables. The landing controller 30 interprets such data for a given landing aircraft and uses the resulting processed data in view of a unique runway library file for the given primary runway 12. For example, the landing controller 30 may maintain a decision table that is particularized for a particular primary runway 12 and index into that table according to one or more of aircraft type or model, aircraft weight, speed, etc., to determine whether the corresponding table entry indicates that the aircraft can or cannot safely take a given high-speed exit ramp 16.

There may be multiple table entries and/or multiple such tables to address the decision-making needed for a primary runway 12 that includes more than one high-speed exit ramp 16. Regardless, in at least one embodiment, the landing controller 30 provides optimized high-speed landing and takeoff solutions for as many as seven aircraft on a given primary runway 12.

As an example of the functional dependency of a given landing solution or profile computation on landing aircraft characteristics, in one embodiment, the "characteristics" of a landing aircraft include identification of the landing aircraft type and sub-type. For example, the type may be a "BOEING 767," and the sub-type may be a "767-300" or a "767-200." Any number of parameters or other default information may be stored for a range of aircraft types and sub-types, and that data may be indexed into for a given landing aircraft, to obtain one or more values to be considered in the landing aircraft profile—e.g., nominal landing and/or landing roll speeds or speed profiles, etc.

Classifications for landing aircraft also may be used to set or adjust one or more values considered in the landing solution computed for a given landing aircraft. For example, the landing aircraft type may be mapped into one in a number of predefined classifications, where each classification has associated with it one or more pre-defined parameters or pre-defined data sets that are used in the landing solution computation. For example, landing aircraft may be classified as "small," "large," and "heavy" (or "jumbo"), and one or more variables used in the landing profile computation set according to those classifications. Non-limiting examples of "small" aircraft include C-172s and T-37s; "large" examples include 757s, 737s, and 717s; and "heavy" or "jumbo" examples include 777s, 747s, and DC-10s.

As for the landing solution computation, in one or more embodiments, it may be understood as integrating recorded and onboard aircraft data (e.g., pounds-of-fuel, take-off weight, final speed, touch-down speed, braking, rollout distances, etc.) It will be understood that the landing controller 30 may be equipped with or associated with detection systems for capturing actual landing speed and weights, for example. It will be further understood that known, recorded take-off data for the landing aircraft can be provided to the landing controller 30 and/or that critical telemetry from the landing aircraft can be provided to the landing controller 30 directly, or made available to the landing controller 30 through associated traffic/flight control systems at the airport.

In any case, for a given landing aircraft, the landing controller 30 evaluates dynamic data for a landing aircraft, in the context of the configured primary runway 12 and associated one or more high-speed exit ramps 16, to determine whether the landing aircraft can be safely directed to an available high-speed exit ramp 16, for early clearing of the primary runway 12. In at least one embodiment, the landing controller 30 makes that determination based on one or more stored sets of data that indicate whether a given type/sub-type and/or classification of aircraft can safely use an available high-speed exit ramp 16. For example, there may be one or more data sets pre-stored for types and/or classes of aircraft that are indexed into as a function of dynamically determined parameters (landing speed and weight, braking, etc.), for the determination of whether the landing aircraft can be safely directed to a high-speed exit ramp 16. In this regard, the landing controller 30 may compute the landing profile for a given aircraft as a go/no-go decision for each of one or more available high-speed exit ramps 16.

As a specific example, one may assume that the primary runway has first and second high-speed exit ramps 16 at spaced-apart locations along the length of the primary runway. As part of the LEWIS-NGRS design methodology, the first high-speed exit ramp 16 is positioned along the primary runway 12 at a location that balances the goal of getting landing aircraft off of the primary runway 12 as early as safely possible with the goal of making the first high-speed exit ramp 16 safely usable by a good percentage of the various landing aircraft types/classes typically handled by the primary runway 12.

One might target, for example, the goal of having, on-average, fifty-percent of the landing aircraft being able to safely use the first high-speed exit ramp 16 (assuming conditions otherwise permit). The second high-speed exit ramp 16 can then be spaced down from the first high-speed exit ramp 16 by a distance that permits capturing, on average, a desired percentage of those landing aircraft that can not safely use the first high-speed exit ramp 16. The same logic can be used for positioning a single high-speed exit ramp 16 at the most strategic location along the length of the primary runway 12, given the intended use of the primary runway 12 and/or based on the type(s) of aircraft most typical for the primary runway 12. Further, it will be understood that the construction or modification of a primary runway 12 with multiple high-speed exit ramps 16 can embody this same strategic positioning.

As for determining whether any given high-speed exit ramp 16 can be safely used by a landing aircraft, one example embodiment has the landing controller 30 computing a landing profile for the aircraft as follows: (1) determine the landing aircraft weight and speed; (2) determine the landing aircraft type/sub-type and/or classification; (3) use the landing aircraft weight, speed, and type/sub-type and/or classification to index into a data table that includes go/no-go indications for whether a landing aircraft can safely use a high-speed exit ramp 16. In this regard, it will be understood that, for the same landing weight and speed, one type/sub-type of aircraft may have the dynamic handling characteristics that allow safe high-speed exit ramp use, while another type/sub-type of aircraft does not. It will also be appreciated that the data tables may be made multi-dimensional, for indexing against runway conditions and other variables, or that multiple tables can be used—e.g., one for dry conditions, one for wet conditions, etc.

Broadly, then, the landing solutions may be conditioned on a range of variables, including prevailing runway conditions, and the landing controller 30 also may be configured such that it disallows high-speed exit ramp use for all aircraft under certain conditions, such as no high-speed exit ramp use at nighttime, no high-speed exit ramp use when IFR are in use, etc. Still further, one or more embodiments of the landing controller 30 may use polynomial or other functional expressions rather than tables, for computationally determining whether a high-speed exit ramp 16 can be safely used by a landing aircraft. However, such implementations are not necessarily exclusive of look-up-tables (or other indexed-data-structure approaches), and a mix of functional computations and data-structure indexing may be used in making the determination as to whether a given landing aircraft can safely use a high-speed exit ramp 16.

In any case, the landing controller 30 solutions control activation of or otherwise drive the high-speed exit lighting system 26. As such, the high-speed exit lighting system 26 is communicatively linked to the landing controller 30 directly or indirectly, or otherwise has access to the landing solution information. In this regard, the high-speed exit lighting system 26 functions as an advanced lighting system that is configured to direct a landing aircraft to the appropriate high-speed exit ramp 16, based on the landing solution generated for that landing aircraft. That is, the high-speed exit lighting system 26 is configured to signal to the landing aircraft which (if any) of the high-speed exit ramp(s) 16 should be used. More broadly, the high-speed exit lighting system 26 is configured to indicate whether a given high-speed exit ramp 16 (or any high-speed exit ramp 16) can be taken by the landing aircraft. For example, if conditions do not allow any high-speed exit ramp 16 usage, the landing aircraft will be sent to the landing runway end for turnoff.

On the other hand, if the aircraft landing solution determined for the landing aircraft permits high-speed exit ramp use, the high-speed exit lighting system 26 signals the high-speed exit ramp 16 to the landing aircraft. Once an aircraft starts its first turn onto the signaled high-speed exit ramp 16, the aircraft will cross over optional traction surfaces 24 (e.g., grids) built in the hard concrete surface at the first turn 18 of the high-speed exit ramp 16. The same or similar traction grids can be used at the high-speed exit ramp's second turn 20, where the landing aircraft transitions from the high-speed exit ramp 16 onto the high-speed landing way 14. The traction surfaces 24 provide the aircraft with greater stability for turning and braking.

From the above high-speed exit ramp description, those skilled in the art will appreciate that the high-speed exit ramp 16 serves as a continuation of an aircraft landing roll out and allows a landing aircraft to transition off of the primary runway 12 without having to stop or even slow down to a taxi roll. Preferably, the high-speed exit ramps 16 use 30-degree angles off the primary runway onto the high-speed exit ramps 16, allowing the aircraft to make one, well controlled turn onto the selected high-speed exit ramp 16. Once on the high-speed exit ramp 16, the landing aircraft with make a second—preferably 30-degree—turn onto the high-speed landing way 14, which allows the aircraft to slow down gradually to taxi speed. The high-speed landing way 14 also can be used as a dual parallel taxiway when airport traffic is slow. Further, in at least one embodiment, the high-speed landing way 14 is strengthened to support landing use, such as when the primary runway is out of service.

Broadly understood, then, the airport runway system 10 described herein integrates aircraft and surrounding data, aids in resolving conflicts, and recommends the best solution for landing and takeoff traffic. In use, the airport runway system 10 can reduce runway use time by 50 percent for a landing aircraft. This time reduction allows a better flow of mixing departures between arrivals. On average, a single runway can facilitate up to four takeoffs and landings a minute. By using the airport runway system 10, a single runway total capacity increases by 25 to 35 percent.

By way of non-limiting examples, the LEWIS-NGSRS offers the following advantages: (1) modular—the LEWIS-NGSRS solves the high cost of building a new runway which may cost up to $1.3 billion and it is a modular solution which is custom fitted and built to standards for each airport's unique design; (2) property acquisition—the LEWIS-NG-SRS reduces and may eliminate the high cost of purchasing new properties and relocating land owners as it allows ready utilization of current airside and landside properties; (3) embankment—the LEWIS-NGSRS will use recycled surface material where needed to elevate airside design build; (4) airfield—the LEWIS-NGSRS allows for the relatively straightforward addition of a high-speed landing way 14 to increase the effective capacity of an existing primary runway 12 rather than requiring the addition of new runways; (5) facilities and navigational Aids—the LEWIS-NGSRS uses a new type of landing controller 30 to increase traffic flow on an existing primary runway 12 rather than requiring the purchase of new NAVAIDS for additional runways; (6) environment/ wetlands mitigation—the LEWIS-NGSRS minimizes environmental and wetlands impact as many airports already have primary runways with sufficient existing space to install parallel high-speed landing ways 14 and therefore minimal to no modernization changes are needed beyond adjustments to current airport fencing; and (7) economics—the LEWIS-NG-SRS is a budget-saving solution that can provide millions of dollars in savings as compared to new runway construction and land purchase costs.

Figure 3A:
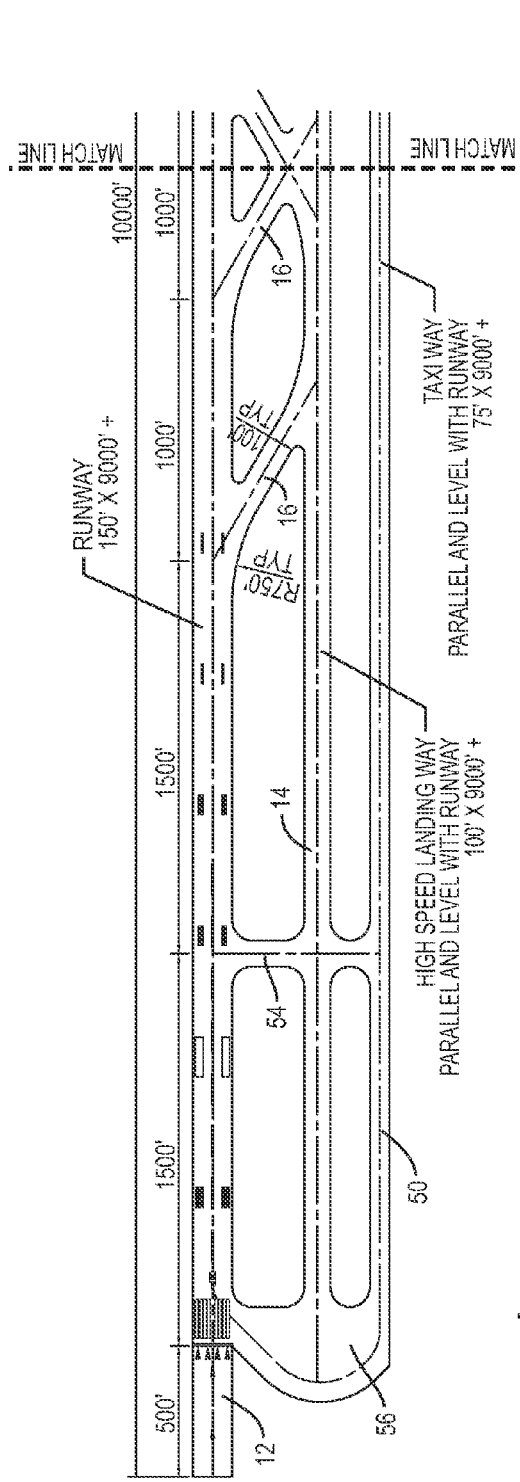
FIGS. 3A/B-FIGS. 8A/B illustrate various embodiments of a runway and landing way configuration for an airport runway system as contemplated herein.
Figure 3B:
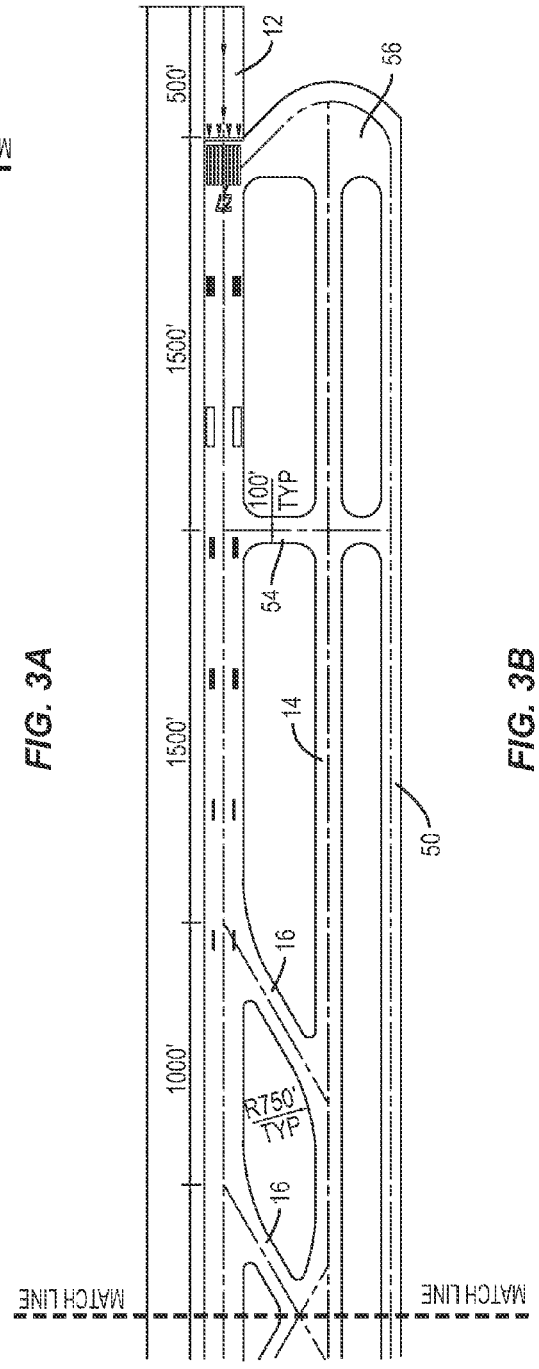

For further appreciation of these and other advantages, FIGS. 3A and 3B illustrate left and right halves of a larger drawing, providing example information for the LEWIS-NG-SRS. One sees a primary runway 12 that is 150 feet wide and 9000 feet long. A high-speed landing way 14 runs alongside the primary runway 12 and is interconnected to the primary runway 12 via a number of high-speed exit ramps 16, shown with exemplary spacing relative to the primary runway 12. One also sees a taxiway 50 running alongside the high-speed exit way 14 and one further sees a number of interconnects 54 and turn-on/turn-off aprons 56.

Figure 4A:
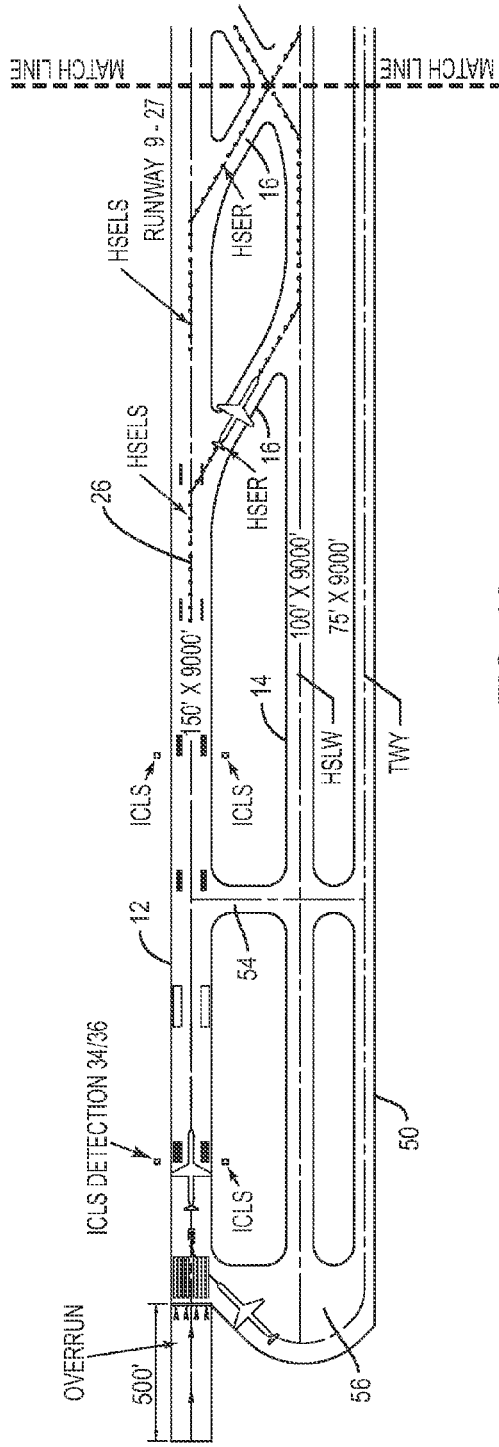
Figure 4B:
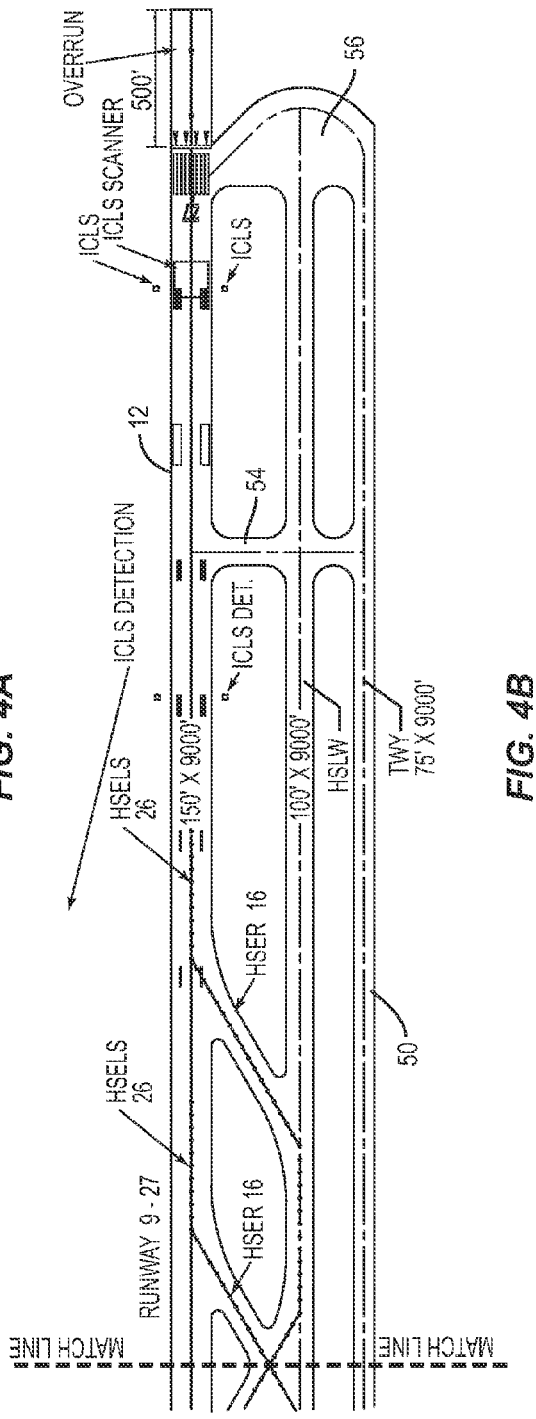

FIGS. 4A and 4B illustrate similar a runway/landing way configuration but adds details related to ICLS detection (e.g., weight/speed detection systems 34 and 36) such as would be interfaced to the landing controller 30. FIGS. 4A/B further illustrate the positioning of lights used in the high-speed exit lighting system 26, wherein one sees that the high-speed exiting lighting system 26 provides directional lights transitioning from the primary runway 12 to the high-speed exit ramp(s) 16.

FIG. 5 adds further details relative to FIGS. 3A/B and 4A/B, such as by illustrating the landing controller 30 in context with one or more control/communication connections 60 to the high-speed exit lighting system 26, one or more control/communication connections 62 to the air traffic control tower/system 64, and one or more control/communication connections 62 or 66 to airfield weather data systems. Note too that an aircraft 70 may provide telemetry to the airport's air traffic control system, which can then be passed to the landing controller 30 or the landing controller 30 can be configured to receive telemetry information directly from the aircraft 70. Further, the landing controller 30 may receive information from a terminal radar approach control system 72 (TRACON).

Figure 6A:
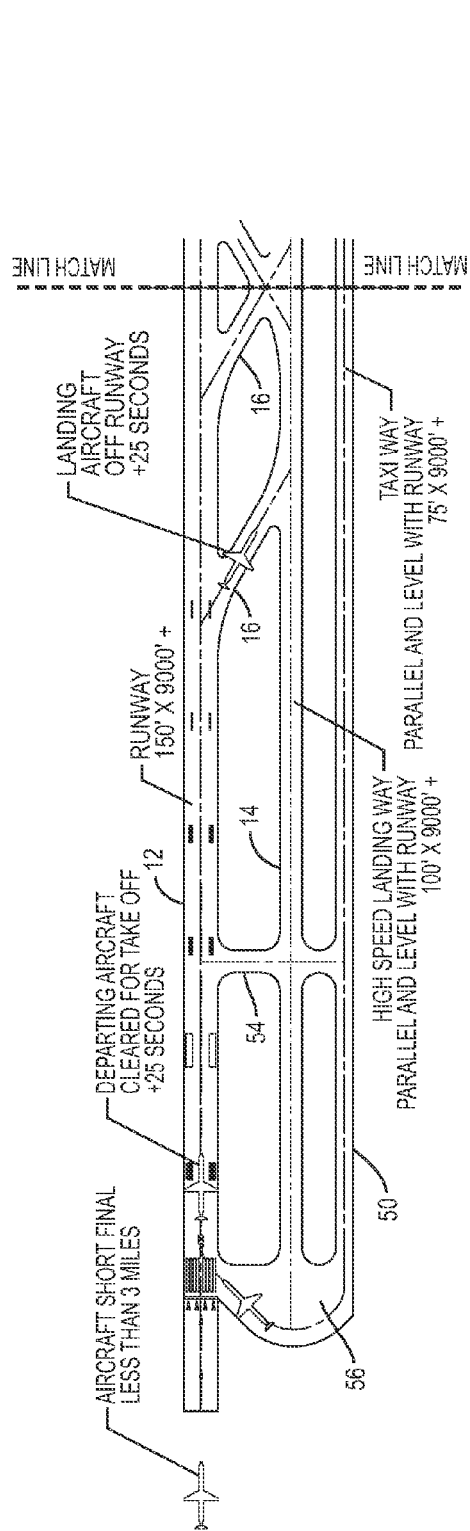
Figure 6B:
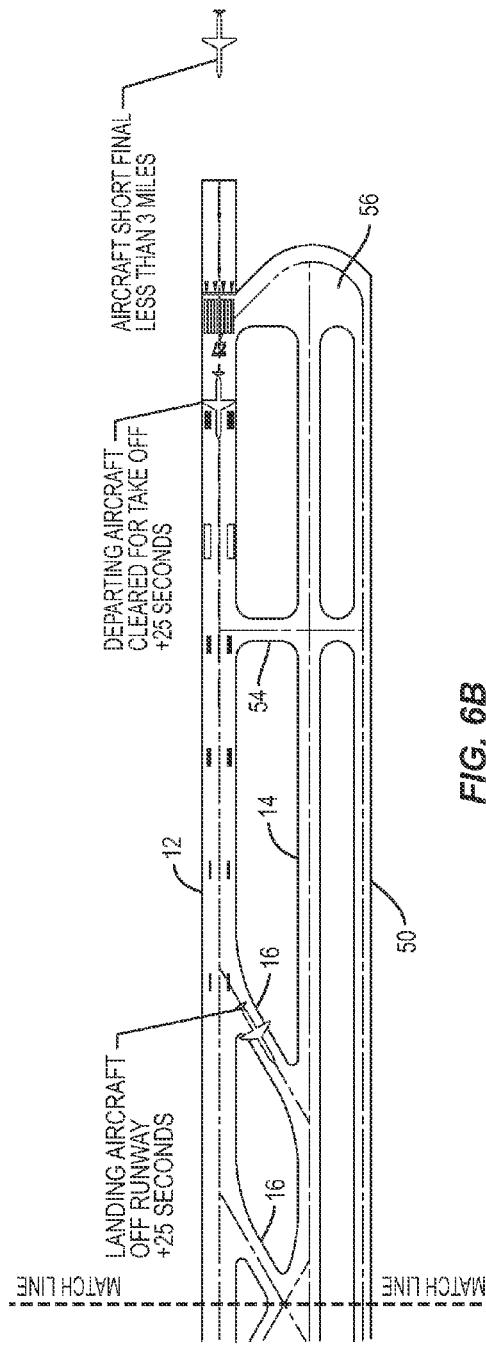

Finally, FIGS. 6A/6B, 7A/7B, and 8A/8B provide further information regarding aircraft positioning and control in the context of the runway system example of FIGS. 3A/3B. Of course, these example diagrams should be understood as non-limiting. More broadly, the present invention in one or more embodiments comprises an airport runway system 10 that includes a primary runway 12 for aircraft landing and a high-speed landing way 14 running in parallel with the primary runway, and at least one high-speed exit ramp 16 positioned at a defined point along the length of the primary runway 12. The high-speed exit ramp 16 comprises an angled departure path from the primary runway 12 onto the high-speed landing way 14 that is configured to allow a high-speed transition of an aircraft during its landing roll from the primary runway to the high-speed landing way 14.

In one embodiment, the high-speed exit ramp 14 provides a first turn 18 at about a 30 degree angle relative to the primary runway 12 for transitioning from the primary runway 12 onto the high-speed exit ramp 16 and a second turn 20 at about a 30 degree angle relative to the high-speed exit ramp 16 for transitioning from the high-speed exit ramp 16 to the high-speed landing way 14. In at least one embodiment, the high-speed exit ramp 16 includes a traction surface 24 at one or both the first and second turns 18 and 20, to provide additional fraction as compared to a nominal traction of the primary runway, for high-speed turning of the aircraft from the primary runway 12 and onto the high-speed exit ramp 16 and corresponding high-speed turning of said aircraft from the high-speed exit ramp 16 onto the high-speed landing way 14. Note that in at least one embodiment the airport runway system 10 includes taxiway 50 and one or more corresponding taxiway 54 exits from the high-speed landing way 10 onto the taxiway 50.

Additionally, as detailed by way of numerous examples herein, the airport runway system 10 includes in one or more embodiments a landing controller 30 that is configured to compute a landing solution for an aircraft that is landing on the primary runway 12 and to determine from that landing solution whether to permit the aircraft to take the high-speed exit ramp 16 onto the high-speed landing way 14. In turn, the landing controller 30 controls a high-speed exit lighting system 26 that is operatively associated with the landing controller 30, for indicating to a pilot of the aircraft whether the aircraft is permitted to take the high-speed exit ramp 16. For example, directional lights included in the high-speed exit lighting system 26 may be illuminated for a particular high-speed exit ramp 16 to indicate permission to use that ramp and left dark to indicate the absence of such permission. Of course, different schemes may be used, such as one color to indicate "no-go" and another color to indicate "go." Further, it will be appreciated that the timing of such lighting control will be matched to the landing aircraft so that the pilot of the aircraft is provided the indication in timely fashion as the aircraft approaches a given high-speed exit ramp 16.

Additionally, in at least one embodiment, the landing controller 30 includes one or more data interfaces 44, and is configured to receive aircraft information for a landing aircraft through said one or more data interfaces 44, and to compute the landing solution based at least in part on said received aircraft information. For example, the landing controller 30 is configured to receive as the aircraft information at least one of said following items: aircraft type or category identification, actual or nominal landing weight, actual or nominal landing speed, and actual or nominal landing roll speeds. In such cases, the landing controller 30 is configured to decide whether to permit the aircraft to take the high-speed exit ramp 16 based on the landing solution. In at least one embodiment, the landing controller 30 is configured to compute the landing solution as a prediction of a landing roll speed for the aircraft and to correspondingly determine whether to permit the aircraft to take the high-speed exit ramp 16 as a function of the predicted landing roll speed.

In an example embodiment, there are two high-speed exit ramps 16 at spaced apart locations along the length of a primary runway 12, one being a first high-speed exit ramp 16 nearest to a landing zone of the primary runway 12 and one being a second high-speed exit ramp 16 further from the landing zone. Here, the landing controller 30 is configured to decide whether to permit the landing aircraft to take either of the high-speed exit ramps 16 onto the high-speed landing way 14. For example, the landing solution may comprise independent go/no-go decisions for each of the available high-speed exit ramps 16 that are provided at spaced apart locations along the length of a primary runway 12.

Also as noted, in one or more embodiments, the landing controller 30 is configured to disallow all use of the high-speed exit ramp(s) 16 even for aircraft with suitable landing solutions, responsive to at least one of: a manual input indicating a disabling of the high-speed landing way, a VFR/IFR indication in the presence of a configuration setting that disallows use of the high-speed landing way during IFR conditions, an inclement weather indication that indicates icing or other hazardous weather conditions, and a nighttime indication in the presence of a configuration setting that disallows nighttime use of the high-speed landing way.

For times when high-speed exit ramp usage is permitted, however, at least one embodiment of the landing controller 30 is configured to determine whether to permit a landing aircraft to take any one of the one or more high-speed exit ramps 16 that are available along a given primary runway 12 based on determining landing information including one or more of a landing weight, a landing speed, and an aircraft type or classification, and using said landing information to index into a data table that includes go/no-go indications for whether the landing aircraft can safely use the high-speed exit ramp.

In at least one embodiment of the airport runway system 10, the primary runway 12 has a length of 7000 feet or greater, and has a first high-speed exit ramp positioned at about 4000 feet down the primary runway 12 and a second high-speed exit ramp positioned at about 5000 feet down the primary runway 12.

With the above in mind, at least one embodiment of the present invention disclosed herein comprises a method of aircraft landing control implemented by a (computerized) landing controller 30. The method includes dynamically determining a landing solution for an aircraft landing on a primary runway 12, based on detecting or otherwise receiving aircraft information for said aircraft, and determining from the landing solution whether to permit the aircraft to take a high-speed exit ramp 16 interconnecting the primary runway 12 with an adjacent high-speed landing way 16 running parallel to said primary runway 12. The method further includes controlling a high-speed exit lighting system 26 that is responsive to the landing controller 30 to provide a pilot of the landing aircraft with a visual indication of whether said landing aircraft is permitted to take the high-speed exit ramp 16 onto the high-speed landing way 14.

In at least one embodiment, dynamically determining the landing solution comprises predicting a landing roll speed for the aircraft based on the aircraft information and determining from the predicted landing roll speed whether to permit the aircraft to take said high-speed exit ramp 16. Further, in at least one such example, the aircraft information comprises one or more of the following items of information: an aircraft type or classification, an actual or nominal landing weight of the aircraft, and an actual or nominal landing speed of the aircraft. Still further, in at least one embodiment, the landing solution comprises one or more items of information in said aircraft information or one or more items of information computed from said aircraft information, such that determining from the landing solution whether to permit said aircraft to take said high-speed exit ramp comprises indexing a stored data table according to said landing solution, wherein said stored data table comprises a plurality of go/no-go decision indicators indicating whether or not a given aircraft with a given landing profile can safely use said high-speed exit ramp.

Of course, the present invention is not limited to above-described method or to any of the foregoing examples. Instead, the present invention is limited only by the patent claims and their legal equivalents.

What is claimed is:

1. An airport runway system comprising:
a primary runway for aircraft landing and a high-speed landing way running in parallel with the primary runway; and
at least one high-speed exit ramp positioned at a defined point along the length of the primary runway and comprising an angled departure path from the primary runway onto the high-speed landing way that is configured to allow a high-speed transition of an aircraft during its landing roll from the primary runway to the high-speed landing way.

2. The airport runway system of claim 1, wherein the high-speed exit ramp provides a first turn at about a 30 degree angle relative to the primary runway for transitioning from the primary runway onto the high-speed exit ramp and a second turn at about a 30 degree angle relative to the high-speed exit ramp for transitioning from the high-speed exit ramp to the high-speed landing way.

3. The airport runway system of claim 2, wherein the high-speed exit ramp includes a traction surface at one or both the first and second turns, to provide additional traction as compared to a nominal traction of the primary runway, for high-speed turning of said aircraft from the primary runway and onto the high-speed exit ramp and corresponding high-speed turning of said aircraft from the high-speed exit ramp onto the high-speed landing way.

4. The airport runway system of claim 1, further comprising a taxiway and one or more corresponding taxiway exits from the high-speed landing way onto the taxiway.

5. The airport runway system of claim 1, further comprising a landing controller configured to compute a landing solution for said aircraft and to determine from that landing solution whether to permit said aircraft to take the high-speed exit ramp onto the high-speed landing way and further comprising a high-speed exit lighting system operatively associated with said landing controller for indicating to a pilot of said aircraft whether said aircraft is permitted to take the high-speed exit ramp.

6. The airport runway system of claim 5, wherein said landing controller includes one or more data interfaces, and is configured to receive aircraft information for said aircraft through said one or more data interfaces, and to compute the landing solution based at least in part on said received aircraft information.

7. The airport runway system of claim 6, wherein the landing controller is configured to receive as said aircraft information at least one of said following items: aircraft type or category identification, actual or nominal landing weight, actual or nominal landing speed, and actual or nominal landing roll speeds; and wherein said landing controller is configured to compute said landing solution as a decision whether to permit said aircraft to take the high-speed exit ramp, based at least in part on said aircraft information.

8. The airport runway system of claim 5, wherein said landing controller is configured to compute said landing solution as a prediction of a landing roll speed for said aircraft and to correspondingly determine whether to permit said aircraft to take the high-speed exit ramp as a function of said predicted landing roll speed.

9. The airport runway system of claim 5, wherein there are two high-speed exit ramps at spaced apart locations along the length of the primary runway, one being a first high-speed exit ramp nearest to a landing zone of the primary runway and one being a second high-speed exit ramp further from the landing zone, and wherein the landing controller is configured to decide whether to permit said landing aircraft to take either of the high-speed exit ramps onto the high-speed landing way.

10. The airport runway system of claim 5, wherein the landing controller is configured to disallow all use of the high-speed exit ramp even for aircraft with suitable landing solutions, responsive to at least one of: a manual input indicating a disabling of the high-speed landing way, a VFR/IFR indication in the presence of a configuration setting that disallows use of the high-speed landing way during IFR conditions, an inclement weather indication that indicates icing or other hazardous weather conditions, and a nighttime indication in the presence of a configuration setting that disallows nighttime use of the high-speed landing way.

11. The airport runway system of claim 5, wherein the landing controller is configured to determine whether to permit said landing aircraft to take the high-speed exit ramp based on determining the landing solution as a function of one or more of a landing weight, a landing speed, and an aircraft type or classification, and using said landing information to index into a data table that includes go/no-go indications for whether the landing aircraft can safely use the high-speed exit ramp.

12. The airport runway system of claim 1, wherein the primary runway has a length of 7000 feet or greater and wherein the high-speed exit ramp comprises a first high-speed exit ramp positioned at about 4000 feet down the primary runway, and wherein the airport runway system further comprises a second high-speed exit ramp interconnecting the primary runway with the high-speed landing way and positioned at about 5000 feet down the primary runway.

13. An airport runway system comprising:
a landing controller that is configured to compute a landing profile for an aircraft landing on a primary runway and to determine from the landing profile whether to permit said aircraft to take a high-speed exit ramp that interconnects the primary runway with a high-speed landing way running parallel to the primary runway; and
a high-speed exit lighting system that is responsive to said landing controller to provide a pilot of said landing aircraft with a visual indication of whether said landing aircraft is permitted to take said high-speed exit ramp onto said high-speed landing way.

14. The airport runway system of claim 13, wherein said landing controller is configured to receive aircraft information for said aircraft through one or more data interfaces and to compute said landing solution based at least in part on said received aircraft information.

15. The airport runway system of claim 14, wherein the landing controller is configured to receive one or more of the following items of information through said data interfaces as said aircraft information: aircraft type or classification, landing weight, and landing speed; and wherein said landing controller is configured to compute a predicted landing roll speed as said landing solution for said aircraft relative to said high-speed exit ramp, based on said aircraft information, and to determine whether to permit said aircraft to take the high-speed exit ramp based at least in part on the predicted landing roll speed.

16. The airport runway system of claim 13, wherein the landing controller includes or is associated with at least one of a landing speed detection system to detect a landing speed of said aircraft and a landing weight detection system to detect a landing weight of said aircraft, and wherein said landing controller is configured to compute the landing solution of said aircraft based on one or both the detected landing weight and the detected landing speed of said aircraft.

17. The airport runway system of claim 13, wherein said landing controller is configured to disallow all use of the high-speed exit ramp even for aircraft with suitable landing solutions, responsive to at least one of: a manual input indicating a disabling of the high-speed landing way, a VFR/IFR indication in the presence of a configuration setting that disallows use of the high-speed landing way during IFR conditions, an inclement weather indication that indicates icing or other hazardous weather conditions, and a nighttime indication in the presence of a configuration setting that disallows nighttime use of the high-speed landing way.

18. The airport runway system of claim 13, wherein the landing controller is configured to determine whether to permit said landing aircraft to take the high-speed exit ramp based on determining landing information as said landing solution, including one or more of a landing weight, a landing speed, and an aircraft type or classification, and using said landing information to index into a data table that includes go/no-go indications for whether the landing aircraft can safely use the high-speed exit ramp.

19. A method of aircraft landing control implemented by a computerized landing controller comprising:
dynamically determining a landing solution for an aircraft landing on a primary runway, based on detecting or otherwise receiving aircraft information for said aircraft;
determining from the landing solution whether to permit said aircraft to take a high-speed exit ramp interconnecting the primary runway with an adjacent high-speed landing way running parallel to said primary runway; and
controlling a high-speed exit lighting system that is responsive to said landing controller to provide a pilot of said landing aircraft with a visual indication of whether said landing aircraft is permitted to take said high-speed exit ramp onto said high-speed landing way.

20. The method of claim 19, wherein said dynamically determining the landing solution comprises predicting a landing roll speed for said aircraft based on said aircraft information and determining from said predicted landing roll speed whether to permit said aircraft to take said high-speed exit ramp.

21. The method of claim 19, wherein said aircraft information comprises one or more of the following items of information: an aircraft type or classification, an actual or nominal landing weight of the aircraft, and an actual or nominal landing speed of the aircraft.

22. The method of claim 19, wherein said landing solution comprises one or more items of information in said aircraft information or one or more items of information computed from said aircraft information, and wherein determining from said landing solution whether to permit said aircraft to take said high-speed exit ramp comprises indexing a stored data table according to said landing solution, wherein said stored data table comprises a plurality of go/no-go decision indicators indicating whether or not a given aircraft with a given landing solution can safely use said high-speed exit ramp.

* * * * *